(12) United States Patent
Takeshita

(10) Patent No.: US 8,405,511 B2
(45) Date of Patent: Mar. 26, 2013

(54) OPTICAL SIGNAL QUALITY MONITORING

(75) Inventor: Hitoshi Takeshita, Tokyo (JP)

(73) Assignee: NEC Corporation, Tokyo (JP)

( * ) Notice: Subject to any disclaimer, the term of this patent is extended or adjusted under 35 U.S.C. 154(b) by 796 days.

(21) Appl. No.: 12/385,140

(22) Filed: Mar. 31, 2009

(65) Prior Publication Data

US 2009/0267778 A1  Oct. 29, 2009

(30) Foreign Application Priority Data

Apr. 21, 2008 (JP) ................................ 2008-110095

(51) Int. Cl.
*G08B 17/12* (2006.01)

(52) U.S. Cl. ........................................ 340/600; 359/281
(58) Field of Classification Search ................... 340/600; 359/281, 259; 356/364
See application file for complete search history.

(56) References Cited

U.S. PATENT DOCUMENTS

| 6,538,738 B1 * | 3/2003 | Okamoto ...................... 356/364 |
| 6,862,377 B2 | 3/2005 | Szafraniec et al. |
| 2004/0071381 A1 | 4/2004 | Szafraniec et al. |

FOREIGN PATENT DOCUMENTS

| JP | 2000-330079 | 11/2000 |
| JP | 2004-138615 | 5/2004 |
| JP | 2005-531937 | 10/2005 |
| WO | WO 03/028254 | 4/2003 |

OTHER PUBLICATIONS

"Automatic Compensation of Polarization-Mode Dispersion for 40 Gb/s Transmission Systems" Jens C. Rasmussen, Member, IEEE, Akihiko Isomura, and George Ishikawa, Member, IEEE Journal Of Lightwave Technology, vol. 20, No. 12, Dec. 2002.
"Chromatic Dispersion and Polarization-Mode Dispersion Monitoring for RZ-DPSK Signals Based on Asynchronous Amplitude-Histogram Evaluation" Zhihong, Li, Member, IEEE, and Guifang Li, Member IEEE Journal Of Lightwave Technology, vol. 24, No. 7, Jul. 2006.
Japanese Office Action dated Aug. 14, 2012 with partial English translation thereof.
Mats Skold, et. al., "PMO-insensitive DOP-based OSNR monitoring by spectral SOP measurements", Optical Fiber Communication Conference, 2005, Technical Digest, OFC/NFOEC, U.S.A., IEEE, Mar. 6, 2005, vol. 4, OThH3, pp. 1-3.
K. E. Cornick, et al., "All-order PMD penalty prediction using SOP string lengths", Lasers and Electro-Optics Society, 2005. LEOS 2005. The 18th Annual Meeting of the IEEE Lasers and Electric-Optics Society, 2005. LEOS 2005., U.S.A., IEEE, Oct. 22, 2005 WEE3, pp. 702-703.

* cited by examiner

*Primary Examiner* — Shirley Lu
(74) *Attorney, Agent, or Firm* — McGinn IP Law Group, PLLC

(57) ABSTRACT

An optical signal quality monitoring apparatus includes a trajectory length acquirer measuring a Stokes vector of an optical transmission signal over an optical signal modulation frequency band and acquiring the length of a trajectory in the optical signal modulation frequency band traced out on a Poincare sphere by the measured Stokes vector as the measurement value; a DGD acquirer acquiring a DGD value of the optical transmission signal the Stokes vector of which is measured by the trajectory length acquirer; and a quality value estimator estimating a quality value by using the length of the trajectory acquired by the trajectory length acquirer and the DGD value acquired by the DGD acquirer.

2 Claims, 19 Drawing Sheets

OPTICAL SIGNAL QUALITY MONITORING

BACKGROUND OF THE INVENTION

1. Field of the Invention

The present invention relates to an optical signal quality monitoring method and an optical signal quality monitoring apparatus that monitor the quality of an optical signal in an optical communication system and, in particular, to an optical signal quality monitoring apparatus and an optical signal quality monitoring method that monitor the quality of an optical signal by using a value estimated from a polarization state.

2. Description of the Related Art

With the expansion of communication capacities, optical communications at a transmission rate exceeding 10 Gb/s per optical signal channel have been put into commercial use and research and development of optical communications at a transmission rate exceeding 100 Gb/s is being actively conducted. In such an ultrahigh-speed optical communication system, even slight waveform degradation can significantly affect the quality of a signal received. Physical phenomena that cause waveform degradation include wavelength dispersion, polarization-mode dispersion, and nonlinear phenomena. Wavelength dispersion and nonlinear phenomena among these phenomena can be avoided to some extent by transmission path design and signal compensation techniques. However, there is no definitive way of avoiding polarization-mode dispersion at present. Therefore, great importance is being placed on accurate monitoring of polarization-mode dispersion and using the result for a control signal for dynamically compensating for waveform distortion or for a trigger signal for failure recovery.

For example, the following four methods for monitoring polarization-mode dispersion for compensating for waveform distortion have been proposed. A first method is to use the Degree of Polarization (DOP) as disclosed in J. C. Rasmussen et. al., "Automatic Compensation of Polarization-Mode Dispersion for 40 Gb/s Transmission Systems," p. 2101, No. 12, Vol. 20, IEEE JLT, 2002. A second method is to use eye opening as disclosed in Zhihong Li et. al., "Chromatic Dispersion and Polarization-Mode Dispersion Monitoring for RZ-DPSK Signals Based on Asynchronous Amplitude-Histogram Evaluation," p. 2859, No. 7, Vol. 24, IEEE JLT, 2006. A third method is to use an RF clock intensity equal to B/2 or a multiple of the symbol rate B of an optical signal as disclosed in JP2000-330079A. A fourth method is to use a State of Polarization (SOP) as disclosed in JP2004-138615A. It is known that these methods can monitor Differential Group Delay (DGD), which is the first-order component of polarization-mode dispersion.

There is also a method for evaluating the quality of a transmitted optical signal by evaluating a Q value as an evaluation measure.

WO2003/028254 discloses a method for calculating DGD based on a measured SOP. The method disclosed in WO2003/028254 uses measured SOP to calculate a Polarization Mode Dispersion (PMD) vector and DGD is obtained from the calculated PMD vector. Accordingly, when the method disclosed in WO2003/028254 is applied to an optical signal quality monitoring apparatus, the configuration of a section relating to the DGD monitoring of the optical signal quality monitoring apparatus cannot be simplified because the method requires the PMD vector to be calculated in order to obtain the DGD.

The techniques disclosed in the documents given above cannot accurately estimate a Q value if a high-order component of polarization-mode dispersion is not negligible. This is because, if a high-order component of polarization-mode dispersion is not negligible, the correlation between the DOP, eye opening, or RF clock intensity and the Q value will not hold. Therefore, it is difficult to apply the methods disclosed in J. C. Rasmussen et. al., "Automatic Compensation of Polarization-Mode Dispersion for 40 Gb/s Transmission Systems," p. 2101, No. 12, Vol. 20, IEEE JLT, 2002 and Zhihong Li et. al., "Chromatic Dispersion and Polarization-Mode Dispersion Monitoring for RZ-DPSK Signals Based on Asynchronous Amplitude-Histogram Evaluation," p. 2859, No. 7, Vol. 24, IEEE JLT, 2006 and JP2000-330079A to optical signal quality evaluation based on a Q value (Q value monitoring).

JP2004-138615A describes an example in which the first-order component of polarization-mode dispersion is obtained from the result of SOP monitoring and a first-order polarization-mode dispersion compensator is controlled to remove polarization-mode dispersion impairment. While JP2004-138615A makes no reference to the relationship between a first-order component of polarization-mode dispersion and a Q value, it is known that the Q value generally is inversely proportional to the first-order component of polarization-mode dispersion.

However, when applied to Q-value monitoring, the accuracy of the monitoring by the method disclosed in JP2004-138615A is low. This is because the method does not take into consideration a high-order component of polarization-mode dispersion. When a high-order component of polarization-mode dispersion is negligible, the correlation between SOP and the Q value is constant. However, when a high-order component of polarization-mode dispersion is not negligible, the correlation between SOP and a Q value varies depending on the magnitude of the first-order component of polarization-mode dispersion and therefore is not constant. Assuming that the correlation between SOP and Q value is constant when a high-order component of polarization-mode dispersion is not negligible, a large error is introduced in estimating a Q value from an SOP. Therefore, in order to accurately estimate a Q value from an SOP when a high-order component of polarization-mode dispersion is not negligible, the correlation between SOP and Q value needs to be corrected based on the magnitude of the first-order component of the polarization-mode dispersion.

Using a Q value having a large estimation error makes optical signal quality information imprecise. As a result, network control, such as failure recovery, based on the optical signal quality information can become difficult and the reliability of the optical network can degrade.

SUMMARY OF THE INVENTION

Therefore, an object of the present invention is to provide an optical signal quality monitoring apparatus and an optical signal quality monitoring method capable of accurately monitoring variations in the quality of an optical signal caused by polarization-mode dispersion even when a high-order component of polarization-mode dispersion is not negligible.

An optical signal quality monitoring apparatus according to the present invention evaluates the quality of an optical transmission signal by using a quality value estimated from a measurement value based on a value measured from the optical transmission signal. The optical signal quality monitoring apparatus includes: a trajectory length acquirer measuring a Stokes vector of the optical transmission signal over an optical signal modulation frequency band and acquiring the length of a trajectory in the optical signal modulation frequency band traced out on a Poincare sphere by the measured Stokes vector as the measurement value; a DGD acquirer acquiring a DGD value of the optical transmission signal the Stokes vector of which is measured by the trajectory length acquirer; and a quality value estimator estimating a quality value by using the length of the trajectory acquired by the trajectory length acquirer and the DGD value acquired by the DGD acquirer.

According to the present invention, there is provided an optical signal quality monitoring method for evaluating the quality of an optical transmission signal by using a quality value estimated from a measurement value based on a value measured from the optical transmission signal. The method includes: measuring a Stokes vector of the optical transmission signal over an optical signal modulation frequency band and acquiring the length of a trajectory in the optical signal modulation frequency band traced out on a Poincare sphere by the measured Stokes vector as the measurement value; acquiring a DGD value of the optical transmission signal the Stokes vector of which is measured; and estimating a quality value by using the length of the trajectory acquired and the DGD value acquired.

According to the present invention, a quality value can be accurately estimated from a measurement value based on a value measured from an optical transmission signal and therefore variations in the quality of the optical signal caused by polarization-mode dispersion can be accurately monitored.

DETAILED DESCRIPTION OF THE PREFERRED EMBODIMENTS

Figure 1A:
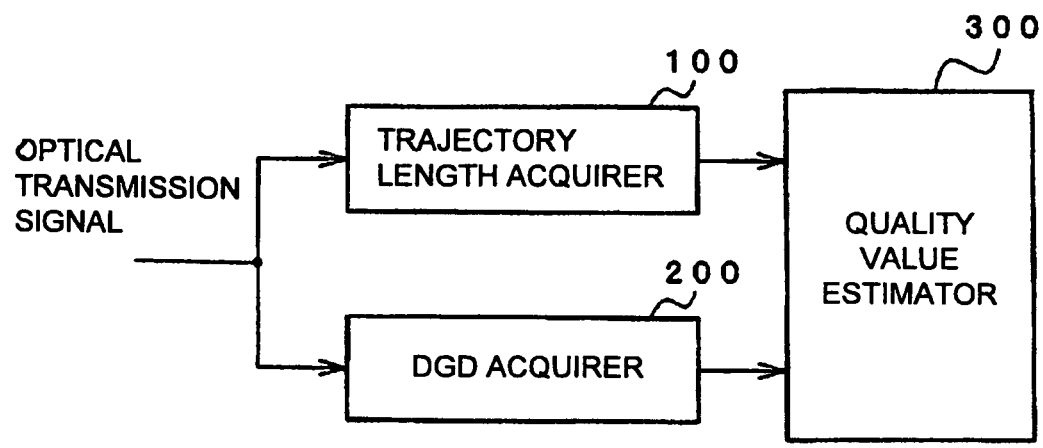
FIG. 1A is a block diagram showing a first example of a basic configuration of an optical signal quality monitoring apparatus according to the present invention.

FIG. 1A is a block diagram showing a basic configuration of an optical signal quality monitoring apparatus according to the present invention. In the configuration shown in FIG. 1A, the optical signal quality monitoring apparatus includes trajectory length acquirer 100 (implemented by SOP length monitor 1103 shown in FIG. 4) which measures the Stokes vector of an optical transmission signal over an optical signal modulation frequency band and acquires the length of the trajectory in the optical signal modulation frequency band traced out by the measured Stokes vector on a Poincare sphere (for example SOP length) as a measurement value, DGD acquirer 200 (implemented by CPU 1302 shown in FIG. 3) which acquires the DGD of an optical signal whose Stokes vector is measured by trajectory length acquirer 100, and quality value estimator 300 (implemented by CPU 1302 shown in FIG. 4) which estimates a quality value (for example a Q value) by using the length of the trajectory acquired by trajectory length acquirer 100 and the DGD acquired by DGD acquirer 200. Processing by trajectory length acquirer 100 for acquiring the length of trajectory and processing by DGD acquirer 200 for acquiring DGD are concurrently performed.

Figure 1B:
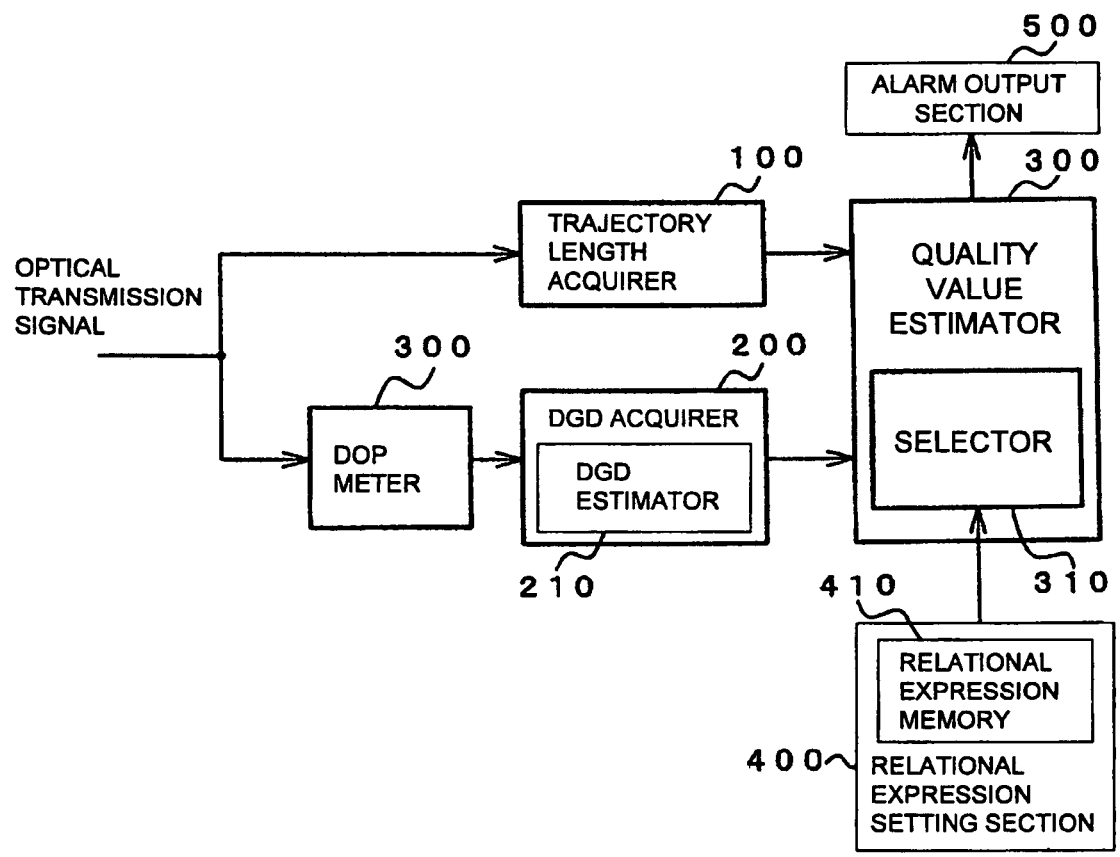
FIG. 1B is a block diagram showing a second example of a basic configuration of an optical signal quality monitoring apparatus according to the present invention.

DGD acquirer 200 may estimate the DGD value from the DOP value at the central wavelength of an optical transmission signal. As shown in FIG. 1B, the optical signal quality monitoring apparatus may include relational expression setting section 400 which stores in relational expression memory 410 (implemented by a register or the like in CPU 1302 shown in FIG. 4, which will be described later) an approximate expression representing the relationship between trajectory length and quality value which is input beforehand from an external source and corresponding to the value of DGD, and DOP meter 300 which measures a DOP value in an optical signal modulation frequency band. DGD acquirer 200 may include DGD estimator 210 which estimates a DGD value from a DOP value measured by DOP meter 300. Quality value estimator 300 may include selector 310 (implemented by CPU 1302 shown in FIG. 4) which selects an approximate expression according to a DGD value estimated by DGD estimator 210 from relational expression memory 410 as the relational expression representing the relationship between a trajectory length and a quality value. According to the configuration, the quality of an optical signal can be accurately estimated when optical signal quality degradation due to a high-order component of polarization-mode dispersion is not negligible.

If an approximate expression corresponding to a DGD value estimated by DGD estimator 210 is not set in relational expression memory 410, quality value estimator 300 preferably determines a relational expression representing the relationship between the trajectory length and the quality value by using an approximate expression that corresponds to a DGD value close to a DGD value that has a corresponding approximate expression set in relational expression memory 410 and that was estimated by DGD estimator 210, in addition to the DGD value estimated by DGD estimator 210.

The optical signal quality monitoring apparatus may also include alarm output section 500 (implemented by CPU 1302 shown in FIG. 4) which outputs an alarm indicating a signal quality degradation to the outside when the length of trajectory of a Stokes vector acquired by trajectory length acquirer 100 exceeds a threshold value predetermined for Stokes vector trajectories on a Poincare sphere.

Figure 2:
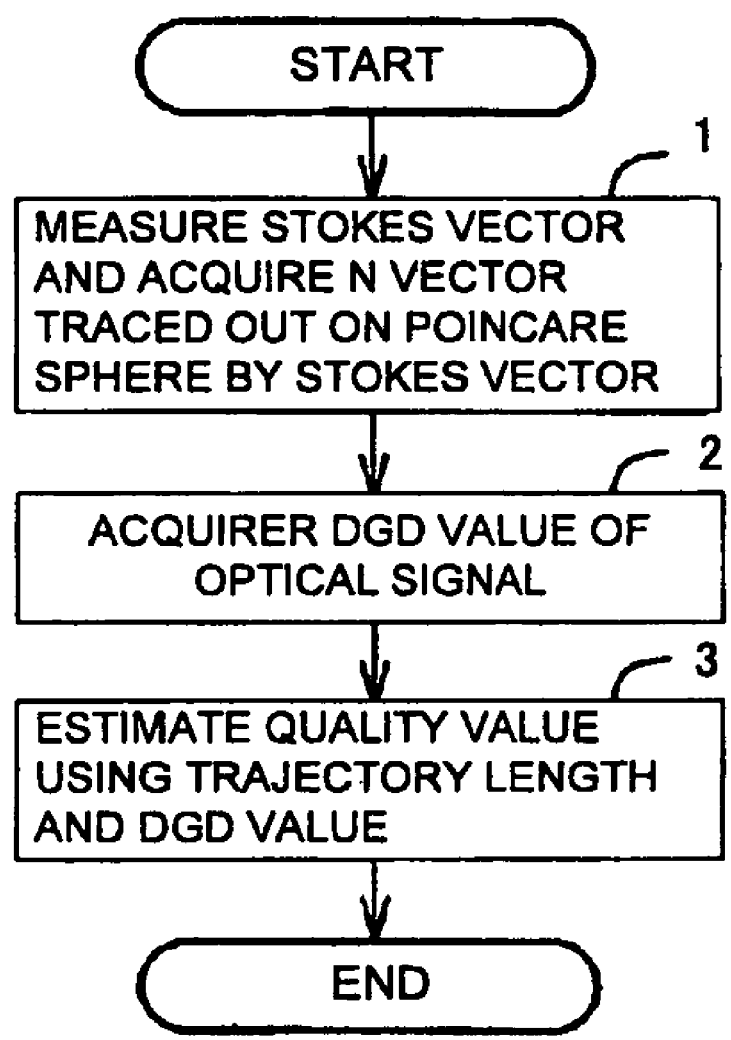
FIG. 2 is a flowchart outlining an optical signal quality monitoring method according to the present invention.

FIG. 2 is a flowchart outlining an optical signal quality monitoring method according to the present invention. As shown in FIG. 2, the optical signal quality monitoring method includes the step of measuring a Stokes vector of an optical transmission signal over an optical signal modulation frequency band and acquiring the length of the trajectory in the optical signal modulation frequency band traced out on a Poincare sphere by the measured Stokes vector as a measurement value (step 1), the step of acquiring the DGD of the optical signal whose Stokes vector is measured (step 2), and the step of estimating a quality value by using the acquired trajectory length and the acquired DGD (step 3).

In the optical signal quality measuring apparatus and method configured as described above, a Stokes vector of a received optical transmission signal in a modulation frequency band is obtained. When the Stokes vector is plotted on a Poincare sphere, one trajectory appears on the Poincare sphere. The length of the trajectory is monitored. The travel distance of the Stokes vector on the Poincare sphere increases as the amount of polarization-mode dispersion increases. Therefore, by monitoring the travel distance of the Stokes vector, that is, the length of the trajectory (SOP length), the amount of polarization-mode dispersion can be monitored. The Stokes vector is a physical quantity representing polarization-mode dispersion including a high-order component and the amount of polarization-mode dispersion including the high-order component can be monitored by monitoring the SOP length. There is a certain correlation between the length of the trajectory and the Q value, which is one measure of the quality of the optical signal.

If polarization-mode dispersion includes a high-order component, the first-order component of the polarization is dependent on wavelength and DGD is defined as the value of the first-order component of polarization-mode dispersion at the central wavelength. If there is wavelength dependency, a DGD value cannot be obtained from a DOP value by using the related art described above. However, the DGD value can be obtained by extracting a portion around the central wavelength of the monitored optical signal by using an optical band-pass filter and then measuring the DOP value. The DGD value can also be obtained by calculating the DOP value only from a Stokes vector near the central wavelength rather than by performing Stokes vector measurement and DOP measurement separately.

Figure 3:
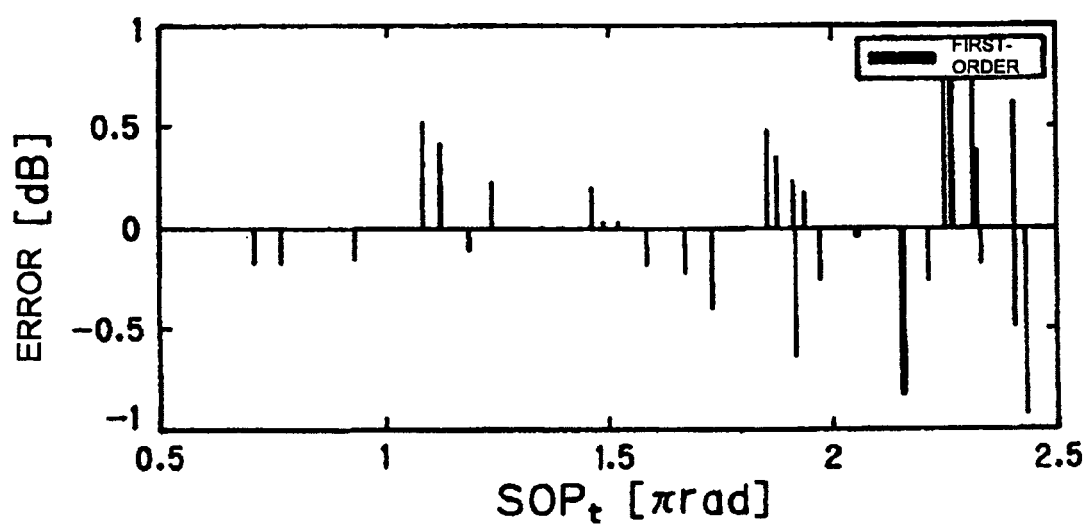
FIG. 3 is a diagram illustrating errors from actual SOP lengths in a first-order approximation of the relationship between SOP length and Q value.

As can be seen from the foregoing, the SOP length and the DGD value can be obtained simultaneously. If a high-order component of polarization-mode dispersion is not negligible, the correlation between the SOP length and Q value varies depending on the amount of DGD. FIG. 3 shows the relationship between Q value and SOP length calculated by using the amount of DGD as a parameter, where the vertical axis represents Q value and the horizontal axis represents the SOP length (SOPt). The accuracy of Q value estimation (an error between an estimated value and actual value) is approximately 1 dB when the SOP length is about 1 πrad whereas the accuracy when the SOP length is about 2 πrad is approximately 2 db. Therefore, it can be said that the accuracy of estimation degrades as the SOP length increases. This is because when the correlation between Q value and SOP length is first-order-approximated, the approximate expression varies depending on the amount of DGD. As the amount of DGD increases, the inclination of the first-order approximation line increases. Therefore, the accuracy of estimation of the Q value from the SOP length can be improved in the case where the first-order approximate expression is changed according to the DGD value, as compared with the case where the relationship between the Q value and the SOP value is first-order-approximated without taking into consideration the amount of DGD.

Figure 4:
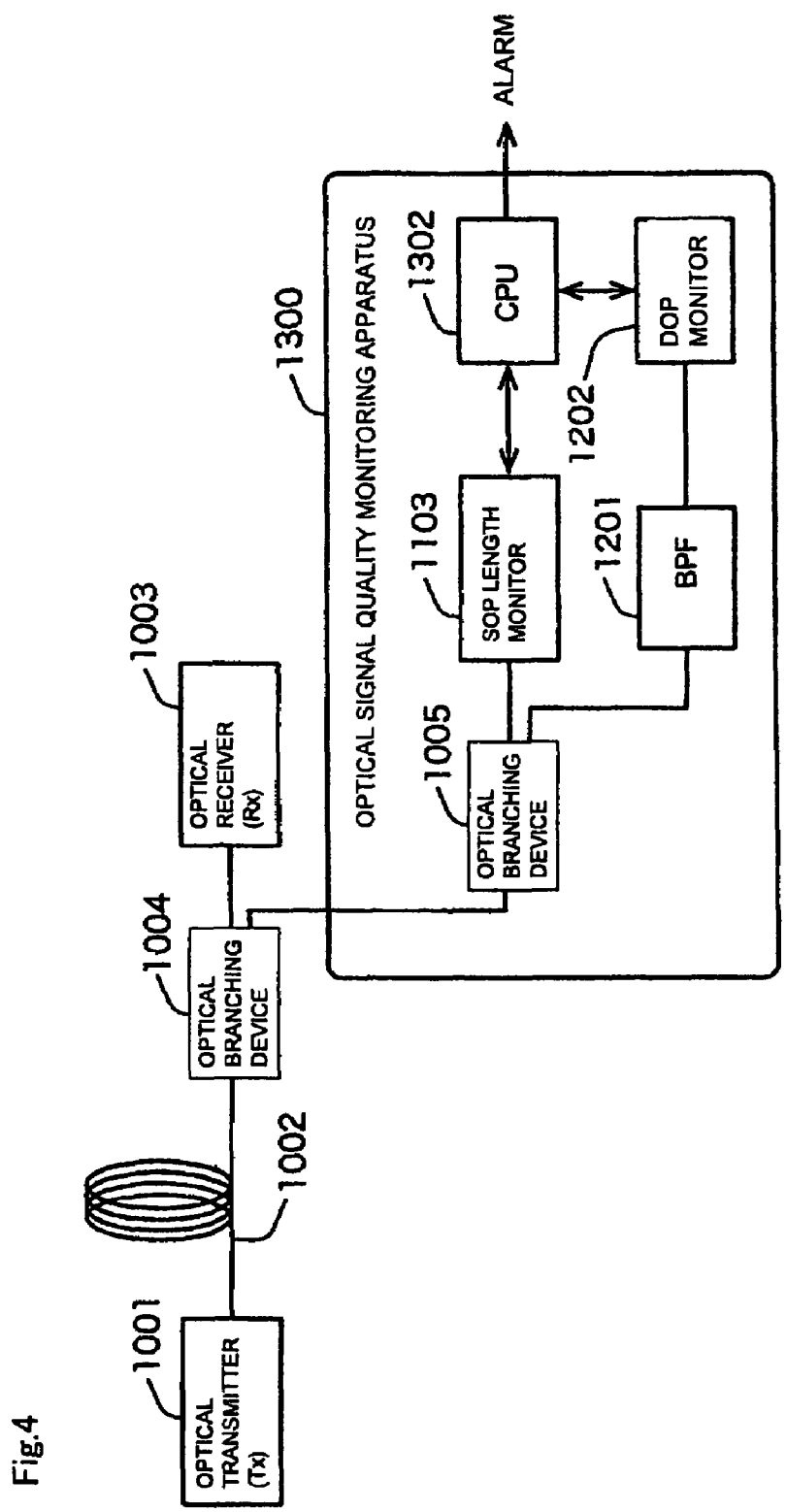
FIG. 4 is a block diagram showing an exemplary configuration of an optical communication system to which an optical signal quality monitoring apparatus and an optical signal quality monitoring method according to an embodiment are applied.

An exemplary embodiment will be described with reference to FIG. 4. FIG. 4 is a block diagram showing an exemplary configuration of an optical communication system to which the optical signal quality monitoring apparatus and method according to the present invention are applied.

In the optical communication system shown in FIG. 4, an optical signal output from optical transmitter (Tx) 1001 is transmitted through optical transmission path 1002 and is received at optical receiver (Rx) 1003. A portion of the transmitted optical signal is branched by optical branching device 1004 immediately before optical receiver 1003 for monitoring. The optical signal branched by optical branching device 1004 for monitoring is guided to optical signal quality monitoring apparatus 1300.

In the optical signal quality monitoring apparatus 1300, the optical signal is separated into two by optical branching device 1005. One of the two separated optical signals is input in SOP length monitor 1103. The other separated optical signal passes through optical band-pass filter (hereinafter referred to as optical BPF) 1201 and is then input in DOP monitor 1202. The SOP length monitored by SOP length monitor 1103 and the DOP value monitored by DOP monitor 1202 are reported to CPU 1302. CPU 1302 is capable of outputting an optical signal quality impairment alarm to the outside on the basis of the SOP length and the DOP value.

Operation of optical signal quality monitoring apparatus 1300 will be described below. In the optical communication system shown in FIG. 4, an optical signal at a modulation rate B bps is output from optical transmitter 1001, passes through optical transmission path 1002, and is received by optical receiver 1003. A waveform distortion occurs due to polarization-mode dispersion while during transmission through optical transmission path 1002. As the waveform distortion increases, that is, as the polarization-mode dispersion increases, the code error rate at optical receiver 1003 increases.

A portion of the optical signal transmitted through optical transmission path 1002 is guided to optical signal quality monitoring apparatus 1300 through optical branching device 1004. The optical signal guided to optical signal quality monitoring apparatus 1300 is separated into two by optical branching device 1005. One of the two separated optical signals is input into SOP length monitor 1103 and the other separated optical signal is input into DOP monitor 1202 through optical BPF 1201.

Figure 5:
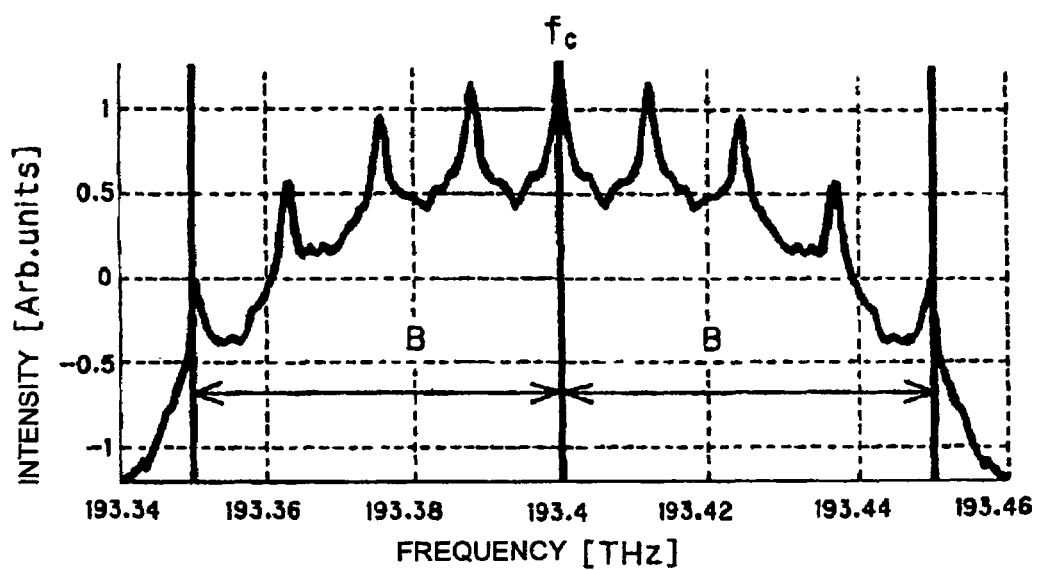
FIG. 5 is a diagram illustrating a Stokes vector measurement range.
Figure 6:
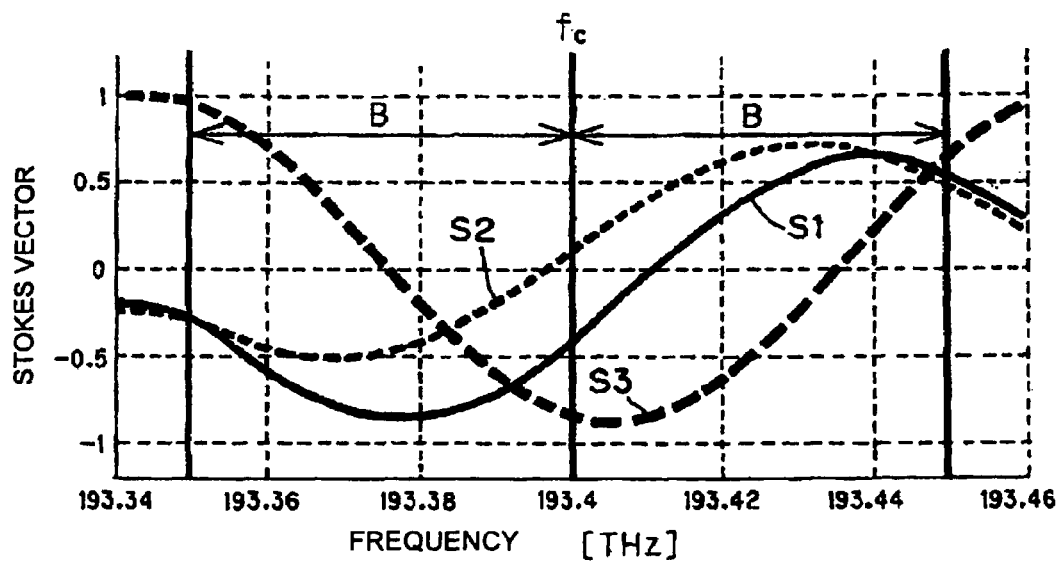
FIG. 6 is a diagram illustrating exemplary Stokes vector measurements.
Figure 7:
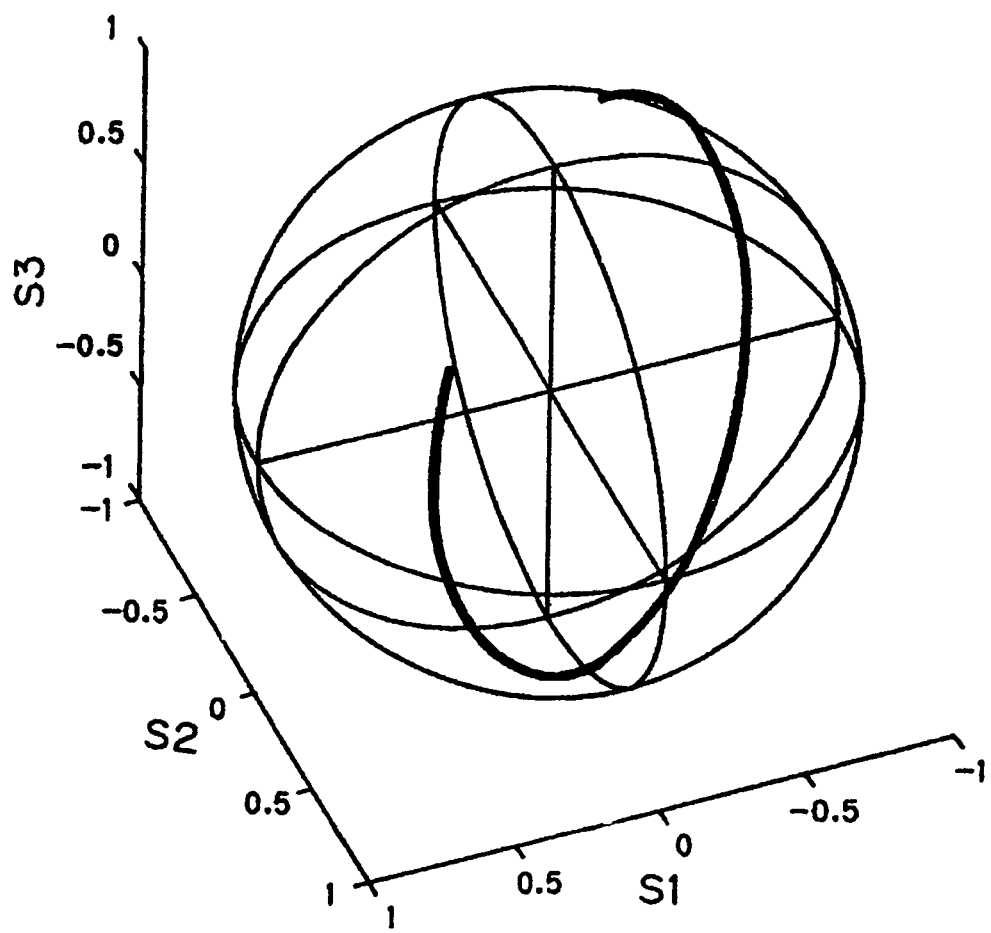
FIG. 7 is a diagram illustrating a Poincare sphere on which a Stokes vector is plotted.

SOP length monitor 1103 measures a Stokes vector, which is a representation of polarization-mode dispersion, at each optical frequency in the range between plus B and minus B of the central optical frequency as shown in FIG. 5. FIG. 6 is a diagram illustrating an exemplary Stokes vector measured by SOP length monitor 1103. The Stokes vector (consisting of Stokes parameters S1, S2, and S3) is measured at each optical frequency. Plotting the measured Stokes vector for each optical frequency on a Poincare sphere results in one trajectory traced out as shown in FIG. 7 (indicated by the thick solid line in FIG. 7). As polarization-mode dispersion increases, the amount of change in the Stokes vector in the optical signal band increases and consequently the length of trajectory plotted on the Poincare sphere (SOP length) increases.

Figure 8:
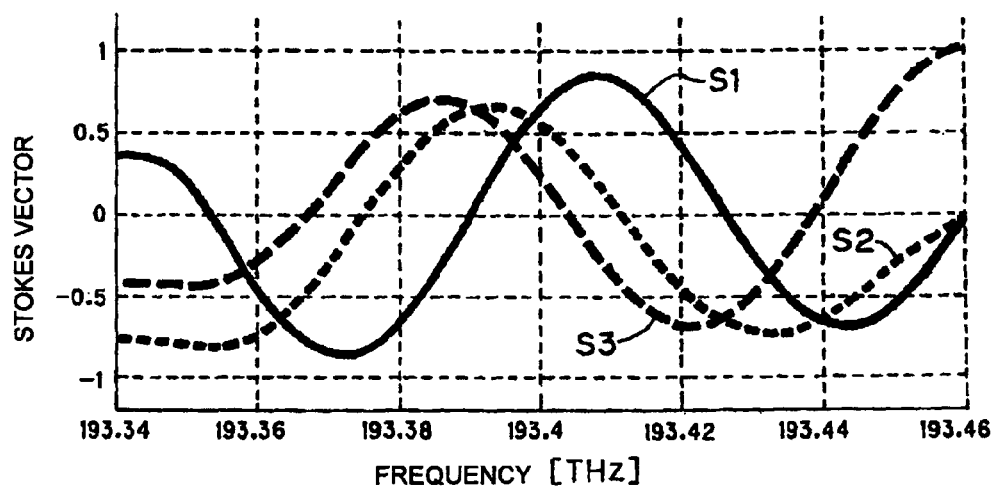
FIG. 8 is a diagram illustrating exemplary Stokes vector measurements.
Figure 9:
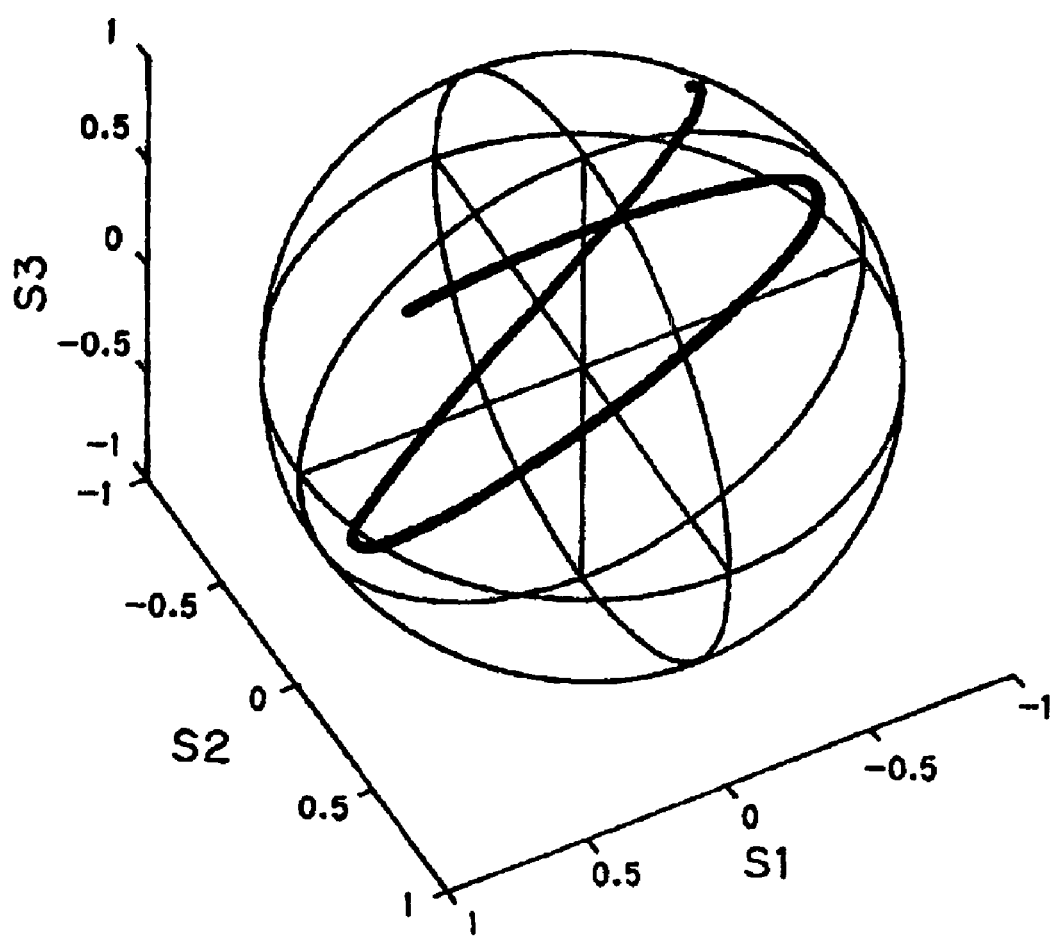
FIG. 9 is a diagram illustrating a Poincare sphere on which a Stokes vector is plotted.

FIG. 8 is a diagram illustrating exemplary Stokes vector measurements obtained when the amount of polarization-mode dispersion is increased compared with the case shown in FIG. 6. FIG. 9 illustrates a plot of the Stokes vector illustrated in FIG. 8 on a Poincare sphere. The length of the trajectory shown in FIG. 9 (indicated by the thick solid line in FIG. 9) is longer than the trajectory shown in FIG. 7. This means that there is a constant correlation between SOP length and the amount of polarization-mode dispersion. It is known that the quality of an optical signal in general degrades as the amount of polarization-mode dispersion increases. Therefore, it can be appreciated that the amount of degradation of optical signal quality can be estimated by monitoring the SOP length.

Figure 10:
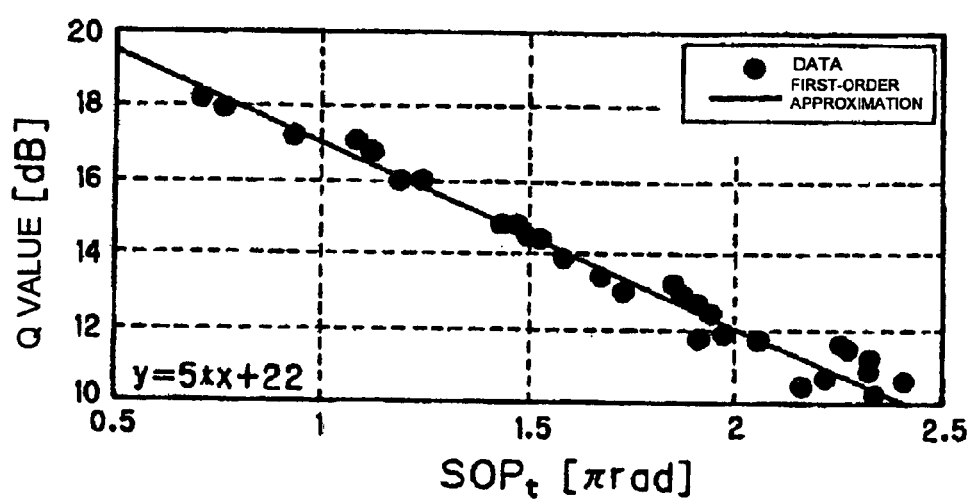
FIG. 10 is a diagram showing the relationship between SOP length and Q value when DGD and SOPMD are changed.

FIG. 10 is a diagram showing the relationship between SOP length (SOPt) and Q value, which is a typical index of the quality of an optical signal, in the case where DGD, which is the first-order component of polarization-mode dispersion, and SOPMD (Second Order Polarization Mode Dispersion), which is a second-order component, are varied. It can be seen from FIG. 10 that, with little error, there is still a constant correlation between the SOP length and Q value when a high-order component is included. FIG. 10 shows that, as a result of a first order approximation of the correlation, an approximate expression for Q value can be given, using SOP length, by $Q=-5 \times SOP+22$. In the equation shown in FIG. 10, "x" represents the SOP, "y" represents the Q value, and "*" is the multiplication sign.

FIG. 3 is a diagram illustrating an error from an actual SOP length (data) in a first-order approximation of the relationship between the SOP length and Q value shown in FIG. 10 (corresponding to the straight line shown in FIG. 10), at the data points represented by the black dots in FIG. 10. As shown in FIG. 3, both of the positive and negative maximum error values (absolute values) are close to 1 dB. That is, there are errors close to +/−1 dB. Accordingly, if the Q value is estimated from the SOP length, an error close to 2 dB at maximum will result. In order to prevent relatively large errors, DOP is used in conjunction to estimate the Q value.

The pass band of optical BPF 1201 is set to a band around the central optical frequency of the optical signals. Accordingly, from among optical signals input in optical BPF 1201, only optical signals of components that are within the frequency band near the central optical frequency are guided to DOP monitor 1202. That is, the band in which DOP monitor 1202 measures the DOP value is limited by optical BPF 1201. Consequently, DOP monitor 1202 can estimate the DGD value, which is the first-order component of polarization-mode dispersion, from the DOP value even when an optical signal input in optical BPF 1201 contains a high-order component. It is widely known that a DGD value can be obtained from a DOP value as disclosed in J. C. Rasmussen et. al., "Automatic Compensation of Polarization-Mode Dispersion for 40 Gb/s Transmission Systems," p. 2101, No. 12, Vol. 20, IEEE JLT, 2002.

Figure 11:
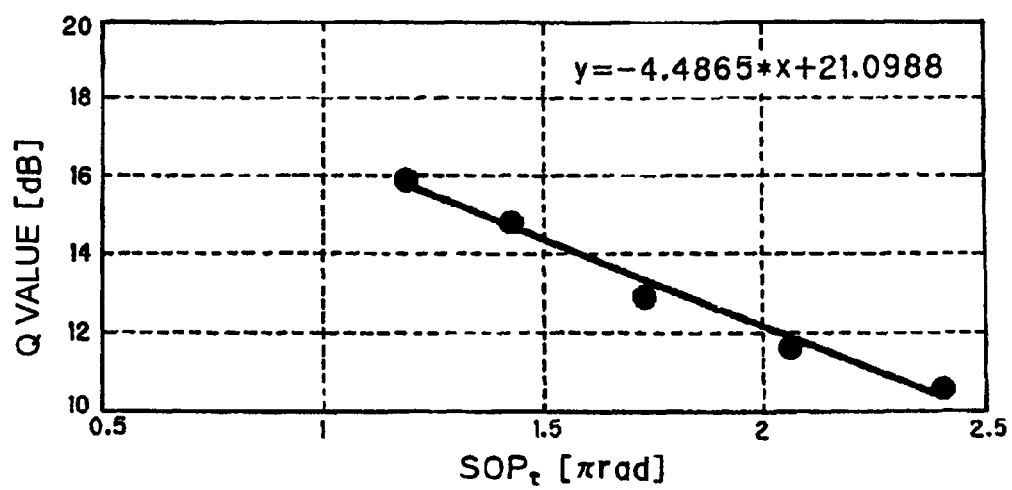
FIG. 11 is a diagram illustrating the result of first-order approximation of the relationship between SOP length and Q value illustrated in FIG. 9 performed individually for each DGD value.
Figure 12:
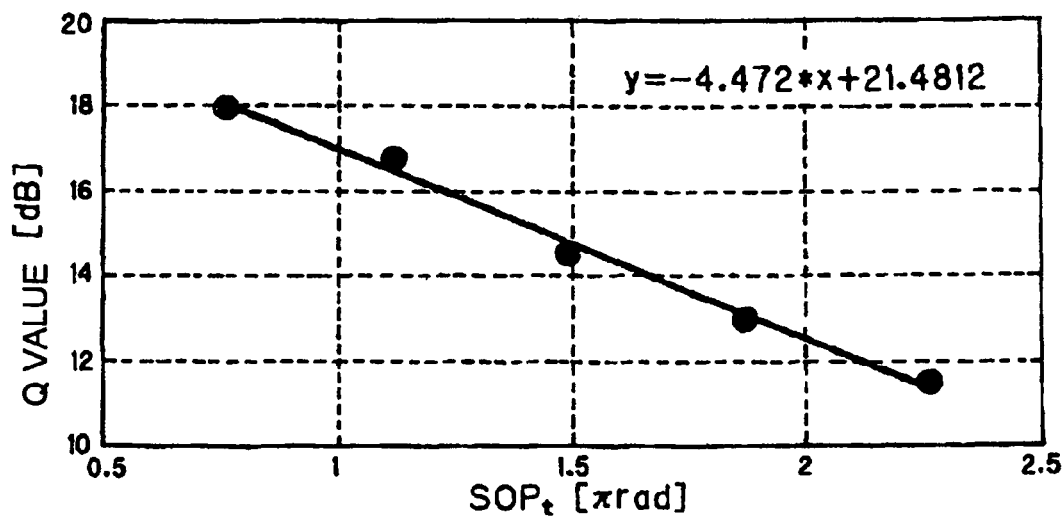
FIG. 12 is a diagram illustrating the result of first-order approximation of the relationship between SOP length and Q value illustrated in FIG. 9 performed individually for each DGD value.
Figure 13:
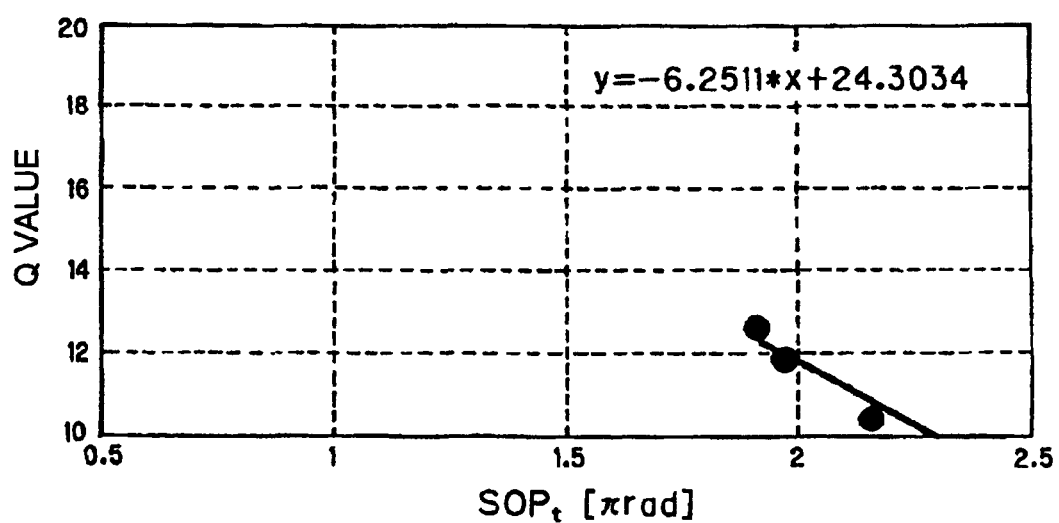
FIG. 13 is a diagram illustrating the result of first-order approximation of the relationship between SOP length and Q value illustrated in FIG. 9 performed individually for each DGD value.
Figure 14:
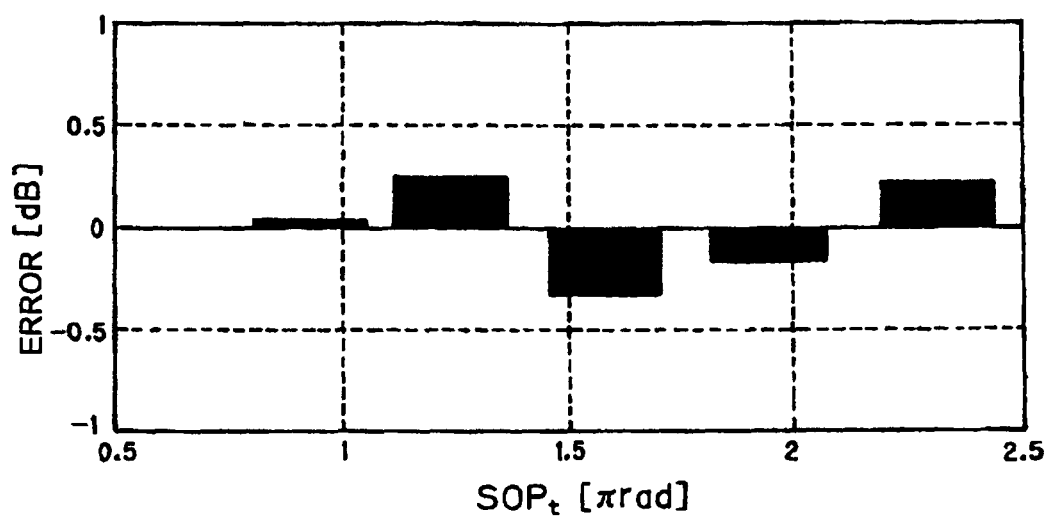
FIG. 14 is a diagram illustrating an error between approximate and measured values.
Figure 15:
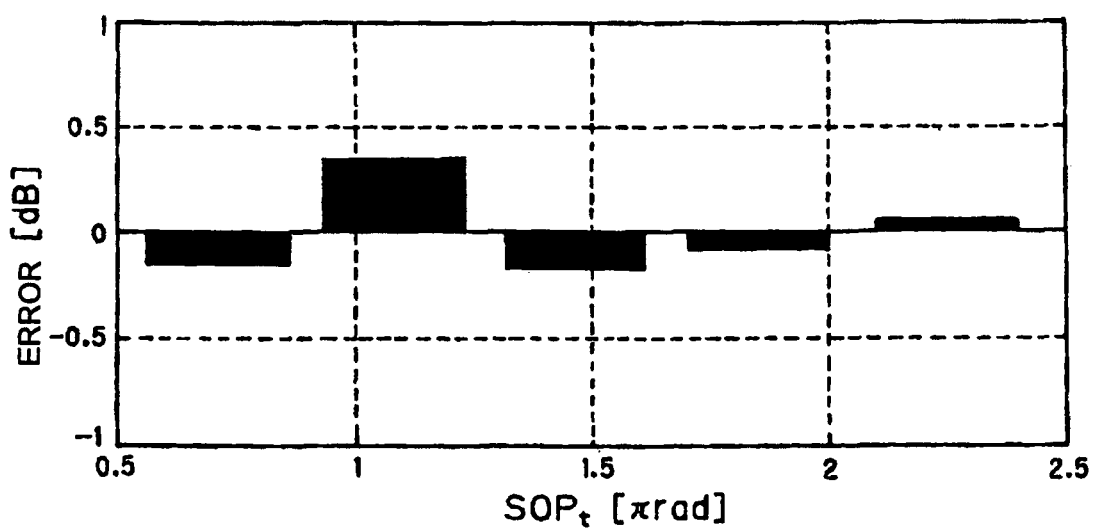
FIG. 15 is a diagram illustrating an error between approximate and measured values.
Figure 16:
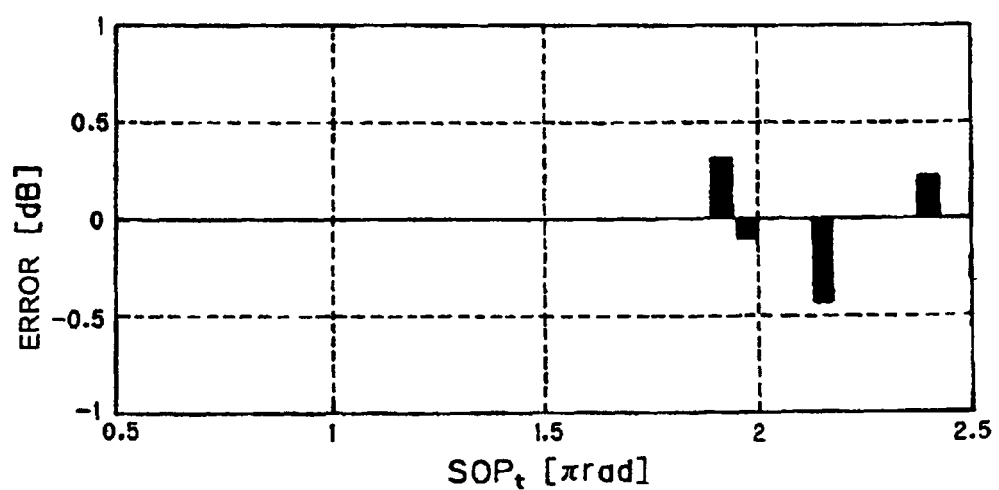
FIG. 16 is a diagram illustrating an error between approximate and measured values.

FIGS. 11 to 13 show the results of first-order approximations of the relationship between the SOP length (SOPt) and Q value shown in FIG. 10 performed individually according to DGD values. FIGS. 14 to 16 are diagrams illustrating errors between approximated values and measured values. The errors shown in FIG. 14 correspond to the relation between SOP length and Q value shown in FIG. 11; the errors shown in FIG. 15 correspond to the relationship between the SOP length and Q value shown in FIG. 12; and the errors shown in FIG. 16 correspond to the relationship between the SOP length and Q value shown in FIG. 13.

FIG. 11 illustrates the relationship between the SOP length and Q value when only the data corresponding to a DGD value of 0 is extracted from the data shown in FIG. 10. The first-order approximate expression (hereinafter simply referred to as the approximate expression) of the relationship between SOP length and Q value is $Q=-4.4865 \times SOP+21.0988$. FIG. 12 illustrates the relationship between SOP length and Q value when only the data corresponding to a DGD value of 4 is extracted. The approximate expression in this case is $Q=-4.472 \times SOP+21.4812$. FIG. 13 illustrates the relationship between the SOP length and Q value when only the data corresponding to a DGD value of 8 is extracted. In this case, the approximate expression is $Q=-6.2511 \times SOP+24.3034$.

It can be seen from FIGS. 14 to 16 that when the relationship between the Q value and SOP length is approximated in accordance with the DGD value, the error between a measured value and an approximated value is less than +/−0.5 db (less than 0.5 db in absolute value), showing that the degree of accuracy is about twice as high as that in the case where approximation is performed without distinction according to DGD values. If an allowable error in Q value estimation is set to +/−0.5 dB, a monitorable SOP length range is from 0 to 1.75 πrad in the case of approximation without distinction according to DGD values. In the case of approximation according to DGD values, the monitorable SOP length range is from 0 to 2.5 grad. Thus, the monitorable range can be extended by about 50%.

Approximate expressions (of the relationship between the Q value and SOP) determined according to DGD values may be obtained by calculation or by actual measurement. The approximate expressions according to DGD values are externally set in memory such as registers in CPU 1302 beforehand.

CPU 1302 receives a DOP value from DOP monitor 1202 and estimates a DGD value by using a preset correspondence relationship between DOP and DGD values. The method for obtaining a correspondence relationship between DOP and DGD values is well known. CPU 1302 then selects an approximate expression according to the DGD value estimated from the DOP value from the memory.

CPU 1302 corrects the approximate expression for estimating the Q value from the SOP length by using the DGD value estimated from the DOP value, if required. For example, if DGD value D0 estimated on the basis of the DOP value obtained from DOP monitor 1202 is not found in the memory, CPU 1302 searches for value D1 greater than and closest to D0 and value D2 smaller than and closest to D0 among the preset DGD values. For example, if the approximate expression corresponding to D1 is $Q=A1 \times SOP+B1$ and the approximate expression corresponding to D2 is $Q=A2 \times SOP+B2$, then the relational expression of the Q value and SOP length corresponding to D0 is considered to be the intermediate value between the approximate expressions of D1 and D2 and can be expressed as $Q=(A1+A2)/2 \times SOP+(B1+B2)/2$.

The method for obtaining an approximate expression for a DGD value that is not set in the memory is not limited to the method that simply uses the average of adjacent two points as described above but other methods may be used. By the correction described above, the degree of accuracy in estimating the Q value from the SOP length can be approximately doubled and the monitorable range can be extended by about 50%.

By changing the factors in the relational expression of the Q value and SOP according to the DOP value (specifically the DGD value) by estimating the Q value from the SOP as described above, a high degree of accuracy in making an estimation can be achieved and a monitoring apparatus capable of accurately estimating the quality of an optical signal containing a high-order component of polarization-mode dispersion can be implemented.

While DOP monitor 1202 in the exemplary embodiment measures the DOP value from the other optical signal from optical branching device 1005, DOP monitor 1202 may calculate the DOP value from a Stokes vector monitored by SOP length monitor 1103. That is, the section that measures the DOP value by calculating the DPO value and the section that measures the length of the trajectory of the Stokes vector on a Poincare sphere may be combined into one on the basis of a Stokes vector monitored by SOP length monitor 1103.

Figure 17:
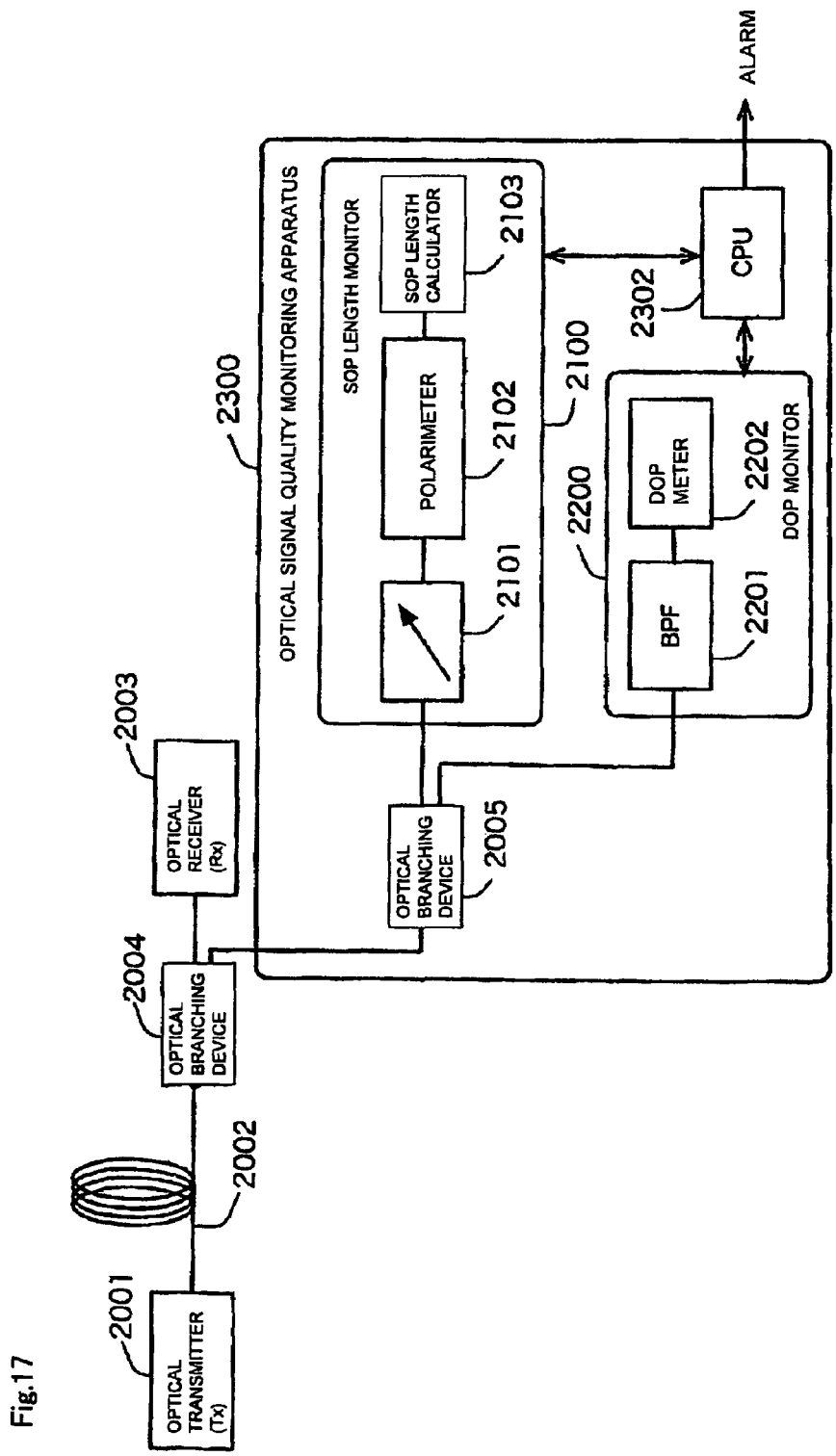
FIG. 17 is a block diagram showing an exemplary configuration of an optical communication system to which an exemplary optical signal quality monitoring apparatus and an exemplary optical signal quality monitoring method according to the present invention are applied.

FIG. 17 is a block diagram showing an exemplary configuration of an optical communication system to which optical signal quality monitoring apparatus 2300, which is a specific example of optical signal quality monitoring apparatus 1300 shown in FIG. 4, is applied. In the optical communication system shown in FIG. 17, optical transmitter (Tx) 2001, optical transmission path 2002, optical branching device 2004, and optical receiver (Rx) 2003 are equivalent to optical transmitter (Tx) 1001, optical transmission path 1002, optical branching device 1004, and optical receiver (Rx) 1003 shown in FIG. 4.

In optical signal quality monitoring apparatus 2300, optical branching device 2005, SOP length monitor 2100, and CPU 2302 are equivalent to optical branching device 1005, SOP length monitor 1103, and CPU 1302 shown in FIG. 4. DOP monitor 2200 including optical BPF 2201 and DOP meter 2202 is equivalent to a component including optical BPF 1201 and DOP monitor 1202 shown in FIG. 4.

In this exemplary embodiment, SOP length monitor 2100 includes variable wavelength filter 2101, polarimeter 2102 which measures Stokes vectors, and SOP length calculator 2103. SOP length calculator 2103 calculates a SOP length from a Stokes vector output from polarimeter 2102.

An optical transmission signal input in optical signal quality monitoring apparatus 2300 is separated into two by optical branching device 2005. One of the separated optical signals is input into SOP length monitor 2100 and the other is input in DOP monitor 2200.

Variable wavelength filter 2101 in SOP length monitor 2100 outputs only an optical signal of a certain wavelength (optical frequency) component out of the optical signal guided to SOP length monitor 2100 to polarimeter 2102. Letting fi denote the optical frequency component guided to polarimeter 2102 (where i is an integer from 1 to n, f1 is an optical frequency lower than the central optical frequency of the optical signal by B Hz, and fn is an optical frequency higher than the central optical frequency by B Hz), polarimeter 2102 then measures the Stokes vector of only the optical frequency component of fi out of the optical signal input in SOP length monitor 2100. By measuring the Stokes vector of only optical frequency component fi (i=1 to n) by polarimeter 2102, Stokes vector Si for each optical frequency component fi can be obtained.

Here, Si is a three-dimensional vector quantity, which can be expressed as Si=(s1i, s2i, s3i). Distance Z2 from coordinate point S1 to S2 on a Poincare sphere is given by the square root of (s11-s12)×(s11-s12)+(s21-s22)×(s21-s22)+(s31-s32)×(s31-s32) and distance Z3 from coordinate point S2 to S3 is given by the square root of (s12-s13)×(s12-s13)+(s22-s23)×(s22-s23)+(s32-s33)×(s32-s33). Therefore, distance Z from coordinate point S1 to Sn, that is, the SOP length, is equal to Z2+Z3+ . . . +Zn, which can be calculated from the measured value of Stokes vector Si of optical frequency component fi.

The SOP length is input into CPU 2302 from SOP length monitor 2100. A DOP value is input in CPU 2302 from DOP monitor 2200. CPU 2302 adjusts an externally preset relational expression of the SOP length and DOP value according to the DOP value (in particular, the DGD value) so that the Q value can be accurately estimated from the SOP length. The adjustment is made in order to choose a relational expression of the SOP length and Q value for each DOP value (in particular each DGD value) as described with respect to the exemplary embodiment given above.

A quality degradation threshold value is externally preset in CPU 2302. When a monitored SOP length exceeds the threshold value, CPU 2302 outputs a quality degradation alarm signal to the outside. Since there is a certain correlation between the monitored SOP length and the estimated Q value, setting the threshold value for the SOP length is practically equivalent to setting a threshold value for the Q value.

The optical signal quality monitoring apparatus and the optical signal quality monitoring method of any of the exemplary embodiments and examples described above have the following effects.

A first effect is that the quality of an optical signal can be accurately monitored. This is because the combined use of the SOP value and DOP (DGD estimated from DOP in a specific example) can improve the degree of accuracy of approximation to the Q value.

A second effect is that the quality in a wide range can be estimated. This is because the increase of accuracy of monitoring improves the accuracy of estimation in a range in which estimation was impractical due to insufficient accuracy in the past, thereby widening the monitorable range.

A third effect is that the method and apparatus can be applied to a wide range. The method and apparatus are capable of being applied to cases where not only the first-order component but also the second-order component of polarization-mode dispersion is not negligible.

A fourth effect is high versatility. The method and apparatus are not dependent on optical signal transmission rates and modulation formats and therefore can be applied to optical signals at any transmission rate and in any modulation format.

A fifth effect is high real-time processing capability. In-service quality estimation can be performed.

A sixth effect is high flexibility. The relational expression between the SOP length and Q value according to DOP (DGD in a specific example) can be altered to further improve the accuracy of Q value estimation and to allow the relational expression to be applied to various types of optical fiber transmission paths.

Figure 18:
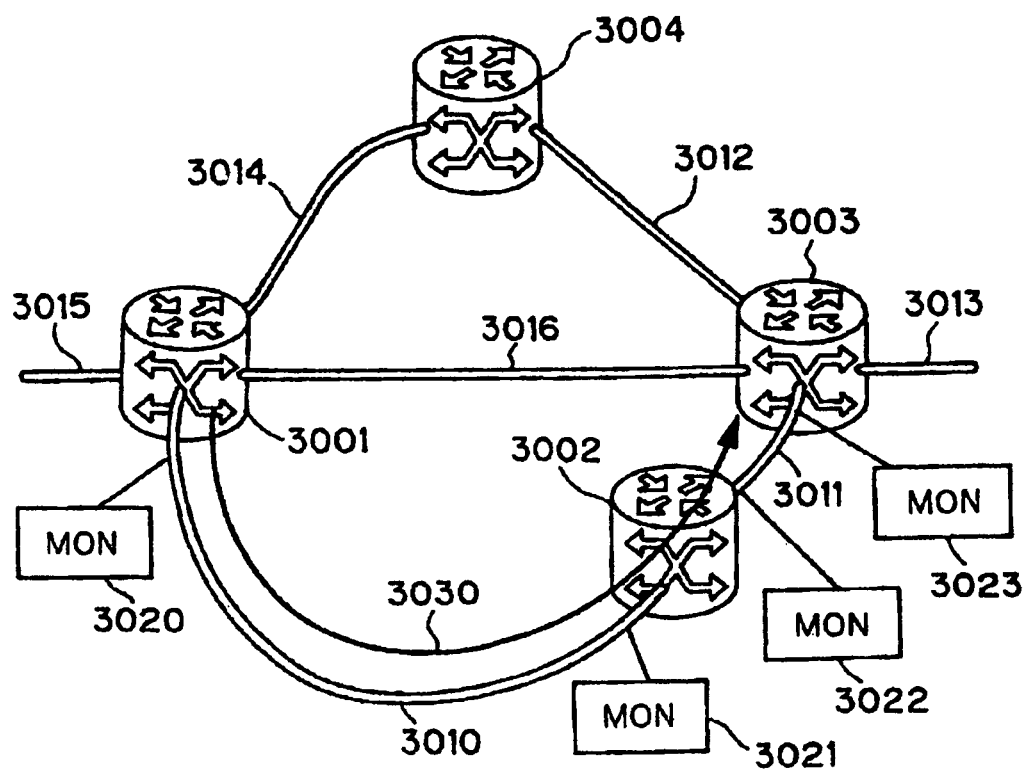
FIG. 18 is a system configuration diagram showing an optical network including optical nodes to which an optical signal quality monitoring apparatus is applied.

FIG. 18 is a system configuration diagram showing an optical network including optical nodes to which an optical signal quality monitoring apparatus according to any of the exemplary embodiments and examples described above is applied. In the system shown in FIG. 18, the optical signal quality monitoring apparatus monitors for polarization-mode dispersion in an optical path from input and output signals of each optical node and when polarization-mode dispersion at the receiving end of the optical path increases, the optical signal quality monitoring apparatus identifies the location in the optical path where there is the increase in polarization-mode dispersion and switches the signal from the optical path to a protection path.

The optical network shown in FIG. 18 includes four optical nodes 3001 to 3004. Optical nodes 3001 to 3004 are interconnected through optical transmission paths 3010 to 3016. An optical signal is transmitted through optical transmission paths 3010 to 3016. Operation in the optical network shown in FIG. 18 will be described with respect to an example in which an optical signal originating at optical node 3001 passes through optical transmission path 3010, optical node 3002, and optical transmission path 3011 in this order and reaches the end optical node 3003.

The optical signal directed to optical node 3003 is transmitted from optical node 3001 through optical path 3030. Optical signal quality monitoring apparatuses (MON) 3020 to 3023 are disposed at the input and output of optical nodes 3001 to 3003 between the origin and the end of optical path 3030. In particular, optical signal quality monitoring apparatus 3020 is provided at the output of optical node 3001, optical signal quality monitoring apparatus 3021 is provided at the input of the optical node 3002, optical signal quality monitoring apparatus 3022 is provided at the output of optical node 3002, and optical signal quality monitoring apparatus 3023 is provided at the input of optical node 3003.

For example, it is assumed that optical signal quality degradation X has occurred at any one location in optical path 3030. For simplicity, it is assumed that there is no optical signal degradation in the rest of optical path 3030. By disposing optical signal quality monitoring apparatuses 3020 to 3023 as shown in FIG. 18, the location of optical signal quality degradation X can be narrowed down.

The process will be described below. When optical signal quality degradation X has occurred at any one location in optical path 3030, optical signal quality degradation X is detected at optical signal quality monitoring apparatus 3023. If the level of the optical signal quality degradation at optical signal quality monitoring apparatus 3020 is lower than or equal to preset threshold value X, it means that optical signal quality degradation X has not occurred at optical node 3001. If the optical signal quality degradation monitor value at optical signal quality monitoring apparatus 3021 is lower than or equal to preset threshold value X, it means that the levels of optical signal quality degradation both at optical node 3001 and in optical transmission path 3010 is lower than or equal to preset threshold.

If the optical signal quality monitor value at optical signal quality monitoring apparatus 3022 is higher than or equal to preset threshold value X, it means that optical signal quality degradation X has occurred between optical signal quality monitoring apparatuses 3021 and 3022 because the level of optical signal quality degradation at optical signal quality monitoring apparatus 3021 is lower than or equal to preset threshold X. Since optical node 3002 is positioned between optical signal quality monitoring apparatuses 3021 and 3022, it can be found that optical signal quality degradation X has occurred at optical node 3002.

Therefore, optical node 3003 at the end of optical path 3030 sends a request to optical node 3001 at the origin of optical path 3030 to switch the signal from optical path 3030 to optical transmission path 3016 through optical transmission path 3016. In response to the request from optical node 3003, optical node 3001 switches the signal directed to optical node 3003 from optical path 3030 to optical transmission path 3016, thereby providing protection.

What is claimed is:

1. An optical signal quality monitoring apparatus which evaluates the quality of an optical transmission signal by using a quality value estimated from a measurement value based on a value measured from the optical transmission signal, comprising: a trajectory length acquirer measuring a Stokes vector of the optical transmission signal over an optical signal modulation frequency band and acquiring the length of a trajectory in the optical signal modulation frequency band traced out on a Poincaresphere by the measured Stokes vector as the measurement value; a Differential Group Delay acquirer acquiring a Differential Group Delay value of the optical transmission signal the Stokes vector of which is measured by the trajectory length acquirer; and a quality value estimator estimating a quality value by using the length of the trajectory acquired by the trajectory length acquirer and the Differential Group Delay value acquired by the Differential Group Delay acquirer; the optical signal quality monitoring apparatus comprising: a relational expression setting section storing in a relational expression memory an approximate expression representing the relationship between a trajectory length and a quality value, the approximate expression being determined according to the value of Differential Group Delay and input from an external source beforehand; and a Degree of Polarization meter measuring a Degree of Polarization value in the optical signal modulation frequency band; wherein the Differential Group Delay acquirer comprises a Differential Group Delay estimator estimating a Differential Group Delay value from the Degree of Polarization value measured by the Degree of Polarization meter; and the quality value estimator comprises a selector selecting an approximate expression according to the Differential Group Delay value estimated by the Differential Group Delay estimator from the relational expression memory as a relational expression representing the relationship between the length of the trajectory and the quality value.

2. An optical signal quality monitoring method for evaluating the quality of an optical transmission signal by using a quality value estimated from a measurement value based on a value measured from the optical transmission signal, comprising: measuring a Stokes vector of the optical transmission signal over an optical signal modulation frequency band and acquiring the length of a trajectory in the optical signal modulation frequency band traced out on a Poincaresphere by the measured Stokes vector as the measurement value; acquiring a Differential Group Delay value of the optical transmission signal the Stokes vector of which is measured; and estimating a quality value by using the length of the acquired trajectory and the acquired Differential Group Delay value; the optical signal quality monitoring apparatus comprising: a relational expression setting section storing in a relational expression memory an approximate expression representing the relationship between a trajectory length and a quality value, the approximate expression being determined according to the value of Differential Group Delay and input from an external source beforehand; and a Degree of Polarization meter measuring a Degree of Polarization value in the optical signal modulation frequency band; wherein the Differential Group Delay acquirer comprises a Differential Group Delay estimator estimating a Differential Group Delay value from the Degree of Polarization value measured by the Degree of Polarization meter; and the quality value estimator comprises a selector selecting an approximate expression according to the Differential Group Delay value estimated by the Differential Group Delay estimator from the relational expression memory as a relational expression representing the relationship between the length of the trajectory and the quality value.

* * * * *